United States Patent [19]

Wharton

[11] 3,708,615

[45] Jan. 2, 1973

[54] GAMMA CORRECTION BANDPASS AMPLIFIER CIRCUITS

[75] Inventor: James Hugh Wharton, Indianapolis, Ind.

[73] Assignee: RCA Corporation

[22] Filed: Feb. 8, 1971

[21] Appl. No.: 113,560

[52] U.S. Cl. .......... 178/5.4 ST

[51] Int. Cl. .......... H04n 9/06

[58] Field of Search .......... 178/5.4, 5.4 ST; 325/62

[56] References Cited

UNITED STATES PATENTS 3,182,137 5/1965 Beatty .......... 325/62

*Primary Examiner*—Richard Murray

*Attorney*—Eugene M. Whitacre

[57] ABSTRACT

An amplifier circuit for use in a one tube color camera has a gain which is determined by the magnitude of an illumination pedestal accompanying a carrier frequency representative of a particular color. The gain as controlled is used to compensate for gamma coefficient distortion provided by an image pickup device utilized in said camera.

6 Claims, 5 Drawing Figures

INVENTOR.
JAMES HUGH WHARTON
BY
[signature]
ATTORNEY

GAMMA CORRECTION BANDPASS AMPLIFIER CIRCUITS

This invention relates to color camera circuitry and, more particularly, to a circuit which serves to amplify a video carrier signal according to the level of a luminance signal.

A one tube color camera operates in conjunction with a spatial filter. Such a filter usually consists of grids of parallel lines which may be angularly superimposed on one another. The lines of such grids are designed to have different subtractive primary colors.

The filter is positioned within the optical system of a camera adjacent the scene to be televised so that the light from the scene or image passes through the filter on its way to the image pickup device. The filter serves to provide three types of information which are sufficient to permit reconstruction of the original color image. Information provided is obtained by scanning the pickup device at television rates. Because of the characteristics of the filter, the color signals are represented by bands of frequencies centered about high frequency carriers.

The low frequency information represents the average light and therefore has the amplitude of the luminance component of the scene. From these information signals one can therefore construct the luminance or Y signal, the blue color difference or B—Y signal, the red color difference or R—Y signal, to thereby provide a composite video signal which can be utilized in the presently employed color television system.

A problem arises with such cameras due to the fact that the image pickup device or vidicon utilized has a particular gamma coefficient. This indicates that the output voltage from the camera for a linear increase in illumination will not be linear. The input-output response or transfer characteristic of this vidicon, due to the gamma coefficient, indicates that for high illuminations the carrier amplitude will be smaller than it should have been. This therefore means that the detected carrier signal will have a different voltage waveform shape than the luminance signal. For example, if a staircase voltage were produced by the scanning process, the luminance signal staircase and the detected color signal staircases would not match in shape. In order to obtain the proper output signal, it is necessary that the shape of these two components be the same.

The present invention includes a circuit which can be used as a carrier bandpass amplifier and whose gain is varied according to the amplitude of the luminance component of the signal. The circuit therefore provides at an output a carrier amplitude which varies according to the amount of luminance signal.

In accordance with an embodiment of the present invention a bandpass amplifier includes an active device having an input, output and common electrode. The input electrode is adapted to be responsive to a signal containing a carrier and suitable luminance and color information. An amplified signal appears at the output electrode and is filtered by means of a tuned circuit. Means are connected to the common terminal of the amplifier which respond to the luminance content of the signal to switch the amplifier into a higher gain mode for luminance signals above a predetermined value.

These and other objects of the present invention will become clearer if reference is made to the foregoing specification when read in conjunction with the accompanying drawings, in which.

Figure 2:
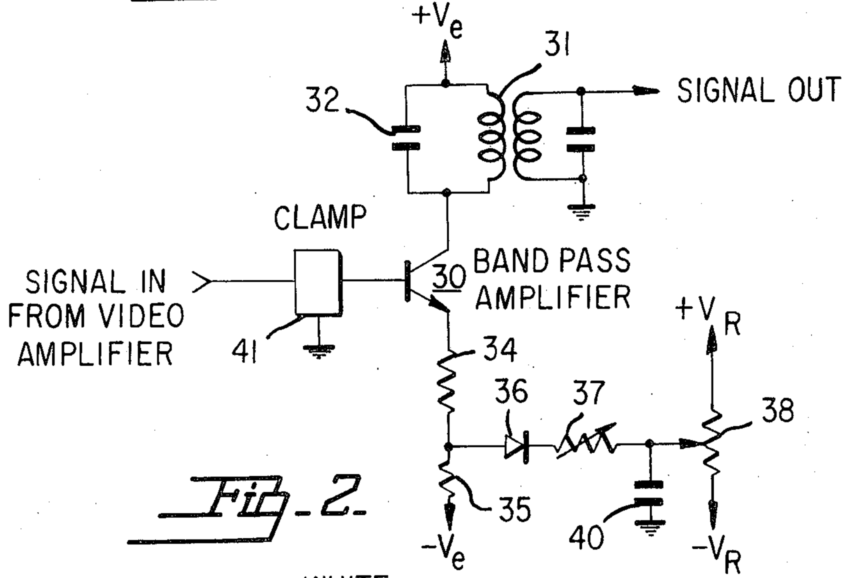
FIG. 2 is a schematic diagram partially in block form of a bandpass amplifier embodying this invention.
Figure 3A:
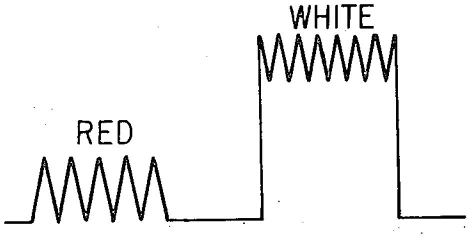
Figure 3B:
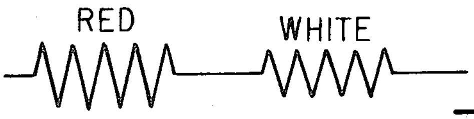
Figure 3C:
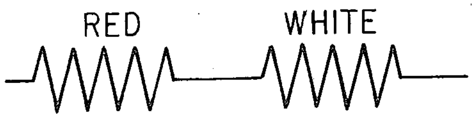

FIGS. 3*a*–3*c* is a series of wave shapes useful in explaining the operation of the circuit shown in FIG. 2.

Figure 1:
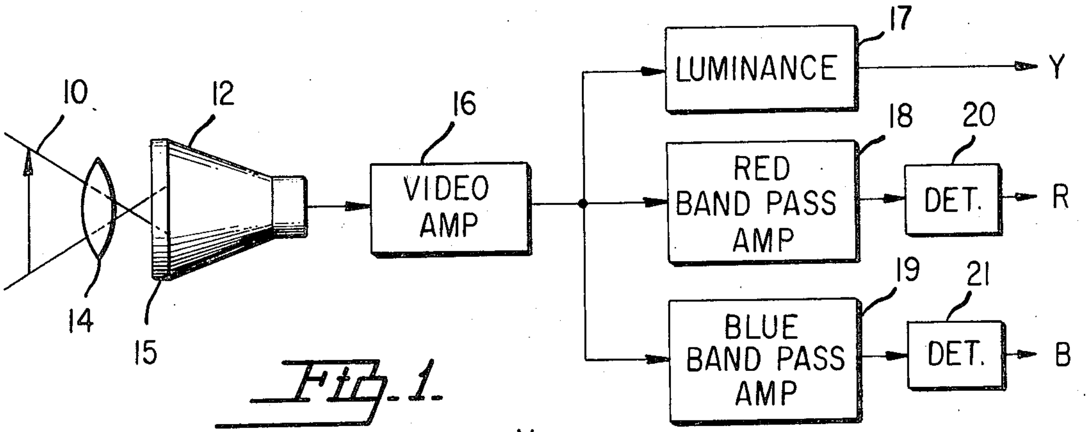
FIG. 1 is a block diagram of a single tube color television camera system.

FIG. 1 shows a single tube color camera employing color encoding techniques. In such a camera the image 10 to be televised is projected on the surface of a vidicon camera tube 12 by means of a lens system 14. A spatial filter 15 is interposed between the photocathode of the vidicon and the scene. The spatial filter 15 is positioned so that the light from the scene as coupled through the lens 14 will pass through the filter on its way to the vidicon. The output of the vidicon 12 is applied to the input of a preamplifier circuit 16.

The output of the amplifier 16 feeds three additional amplifier circuits. The low frequency components contained in the output signal of video amplifier 16 are applied to a luminance amplifier 17, which is responsive to the frequencies extending up to about 3 megacycles.

There is a red bandpass amplifier 18 responsive to information approximately centered about 5 megacycles, and a blue bandpass amplifier 19 which has a center frequency approximately centered about 3.5 megacycles.

The outputs of the bandpass amplifiers 18 and 19 are applied to separate envelope detectors 20 and 21 which provide at their outputs electrical signals representing the red and blue information signals as derived from the original scene.

The signal at the output video amplifier 16 possesses high frequency carriers which are those frequencies generated by the scanning process. In order to separate the various items of information which are present in the scene and exist in the frequency domain, a scanning process is employed. A typical spatial filter as 15 might contain about 270 lines vertically and 190 lines vertically in the respective grid structures. When the scene is scanned in the conventional manner at conventional television rates (i.e., approximately 53 microseconds per line), a 5 megacycle signal is produced which is amplitude modulated by the amount of red light present. Another carrier at about 3.5 MHz is also produced which is amplitude modulated by the amount of blue light present. The low frequency information, also derived as a result of the scanning process, represents the available light and is the luminance amplitude component. The high frequency carrier signals, as indicated above, corresponding to the appropriate encoded colors are therefore separated by appropriate bandpass amplifiers 18 and 19 and the separated carrier and sidebands are detected and utilized as the red and blue signal information, respectively.

The vidicon 12 exhibits a certain nonlinearity which can be described in terms of the well known gamma coefficient. This coefficient or transfer characteristic indicates that the output voltage from the vidicon will not be linear for a linear increase in scene illumination. The transfer characteristic defined in terms of the gamma coefficient causes the amplitude of the abovenoted carrier signals to decrease from a desired value according to the illumination in the scene. This therefore causes the detected waveforms or signals from the output of detectors 20 and 21 to have different shapes than the luminance signal. In order to obtain proper signals after combining, it is necessary that the shapes be the same.

FIG. 2 shows an amplifier circuit which can be used as bandpass amplifier 18 or 19 shown in the diagram of FIG. 1.

A transistor 30 is arranged in a common emitter input configuration and has its collector electrode coupled through a tuned circuit comprising the primary winding inductance of transformer 31 in shunt with capacitor 32, to a source of operating potential $+V_e$. The emitter electrode is coupled through resistors 34 and 35 to a source of reference potential or negative potential $-V_e$. The junction between resistors 34 and 35 is coupled to the anode electrode of a diode 36 whose cathode is coupled through a potentiometer 37 to the arm of a second potentiometer 38. Potentiometer 38 has one terminal coupled to a source of reference potential designated as $+V_R$ and the other terminal coupled to a source of negative reference potential labeled as $-V_R$. The arm of potentiometer 38 is bypassed to ground by means of a filter capacitor 40. The input or base electrode of transistor 30 is coupled through a suitable clamping circuit 41 to the output of a video amplifier 16 in FIG. 1. The function of the clamp circuit is to set the base voltage at some value with respect to the input signal. The voltage clamped to, for example, may be ground. In this manner the signal variations applied to the base may have DC components depending upon the nature and waveshape of the signal, as these signals are all clamped to a predetermined valve.

The operation of the circuit will be described in conjunction with FIG. 3.

As indicated above, in order to obtain a proper signal capable of being combined to form a composite signal from a color encoded camera chain, one has to assure that the carrier associated with the respective color information be amplified more at high luminance levels than at low luminance levels due to the nonlinear transfer characteristic of the vidicon.

FIG. 3*a* shows waveforms of color information obtained by scanning a red bar followed by a white bar. The pattern is that produced by scanning a standard NTSC color bar pattern. The amplitude of the high frequency carrier is also approximately shown. The signal of FIG. 3*a* would be that signal applied at the base electrode of the transistor 30. It can be seen from FIG. 3*a* that the amplitude of the carriers associated with the white bar is smaller than that carrier associated with the red bar. As indicated, the reason for this is due to the luminance pedestal and the gamma coefficient of the vidicon. This white bar signal has a larger DC component than the red bar which, as shown, has none. To avoid the aforementioned problems, it is desired that the amplitude of these carriers be made the same, because of the nonlinear transfer characteristic of the vidicon.

FIG. 3*b* shows the output of the amplifier 30 if no correction were available. It is clear from FIG. 3*b* that the carrier representing the white bar is less than the carrier representing the red bar. Therefore, the output of the detector in the red channel (as detector 20 of FIG. 1) would not correspond to the shape of the signal generated by the luminance channel.

The circuit of FIG. 2 operates as follows. When the diode 36 is conducting, the gain of the transistor amplifier 30 is increased. The diode 36 conduction serves to bypass resistor 35 which normally serves to operate as a gain degenerating resistor. If the diode 36 is nonconducting, the gain of the amplifier is lower.

Assume that the signal shown in FIG. 3*a* is applied to the base of the transistor 30. During the white information bar the voltage at the emitter will increase due to the level of the luminance component shown. As soon as the voltage at the anode of the diode 36 increases to equal the voltage at the cathode, the diode conducts thus increasing the gain of the amplifier. This serves to therefore amplify the carrier signal present on the luminance component by a larger factor. In this manner the output signal obtained at the collector of transistor 30 through the transformer 31 has the same carrier magnitude for both the red and white bars as shown in FIG. 3*c*. The point at which the diode 36 conducts and therefore the amount of the gain control available is a function of the setting of the potentiometer 38 and adjustment of potentiometer 37.

The above-described circuit can operate with a plurality of different vidicons in one tube color cameras to give a variety according to the particular characteristics of the vidicon and the amount of correction desired. The circuit, as shown, automatically assures that the carrier signal at high luminance levels will be amplified more than the carrier signal at low luminance levels, thereby completely compensating for the nonlinear characteristics of the vidicon 12 employed in a typical encoded camera system.

What is claimed is:

1. In a television camera of the type employing an image pickup device and a spatial filter adjacent said device to intercept the light from a scene prior to application of said light to said pickup device, said camera employing means for scanning said scene to cause said pickup device to provide at an output terminal thereof a plurality of carrier signals each one of which is representative of a different color present in said scene, said carrier signals also accompanied by a signal component indicative of the illumination of said scene, said pickup device having a given gamma coefficient which undesirably serves to cause the amplitude of said carrier signals to decrease from a desired value when scenes with high illumination are scanned, in combination therewith apparatus for controlling the amplitude of at least a first of said carrier signals according to scene illumination, comprising:
   a. an amplifier circuit having an input, output and common electrode,
   b. means coupled to said input electrode for applying thereto one of said carrier signals,
   c. means coupled to said common electrode responsive to the magnitude of said signal component indicative of the illumination to increase the gain of said amplifier to said carrier signal to thereby compensate for the undesirable effect of said gamma coefficient of said vidicon.

2. The combination according to claim 1 wherein said amplifier circuit includes: a) a transistor having a base input electrode, a collector output electrode and an emitter common electrode.

3. The combination according to claim 1 further including:

a. a tuned circuit coupled to said output electrode and tuned to cause said amplifier circuit to be a bandpass amplifier of said first carrier signal.

4. The combination according to claim 1 wherein said means coupled to said input electrode includes a clamping circuit for referencing said input signal at a predetermined clamping level.

5. The combination according to claim 1 wherein said means coupled to said common electrode further comprises:

a. a resistor coupling said common electrode to a point of reference potential, b. a unidirectional current conducting device having first and second terminals, said first terminal being connected to a point on said resistor, c. means having a low impedance at said carrier frequency coupled to said second terminal of said unidirectional current conducting device to bypass a portion of said resistor when said unidirectional device conducts to thereby increase the gain of said amplifier.

6. The combination according to claim 5 wherein said means having a low impedance comprises a capacitor.

* * * * *

UNITED STATES PATENT OFFICE

CERTIFICATE OF CORRECTION

Patent No. 3,708,615 Dated Jan. 2, 1973

Inventor(s) James Hugh Wharton

It is certified that error appears in the above-identified patent and that said Letters Patent are hereby corrected as shown below:

Column 4, line 31, after "variety" insert -- of gain variations --.

Signed and sealed this 29th day of May 1973.

(SEAL)
Attest:

EDWARD M.FLETCHER,JR.
Attesting Officer

ROBERT GOTTSCHALK
Commissioner of Patents

FORM PO-1050 (10-69)
3530 6|72

USCOMM-DC 60376-P69
☆ U.S. GOVERNMENT PRINTING OFFICE : 1969 O—366-334